Aug. 10, 1965   R. W. NORRIS, JR   3,199,792
COMMINUTING AND DISPERSING PROCESS AND APPARATUS
Filed July 20, 1962   3 Sheets-Sheet 1

INVENTOR
ROBERT W. NORRIS, JR.

BY Beale and Jones
ATTORNEYS

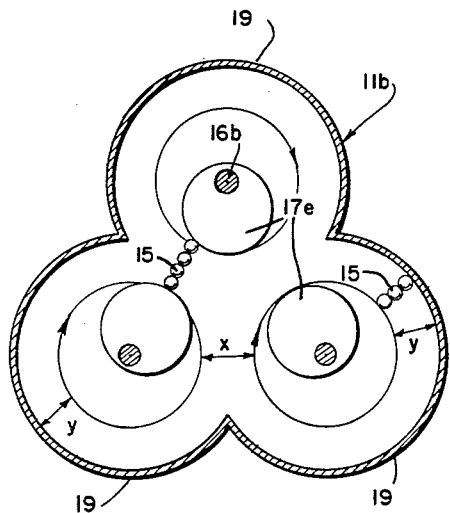
FIG. 7
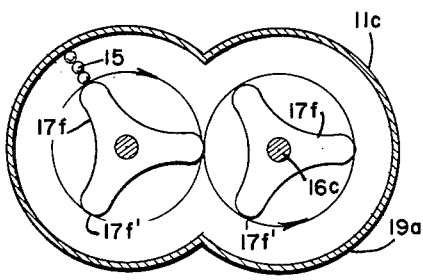
FIG. 8
FIG. 9
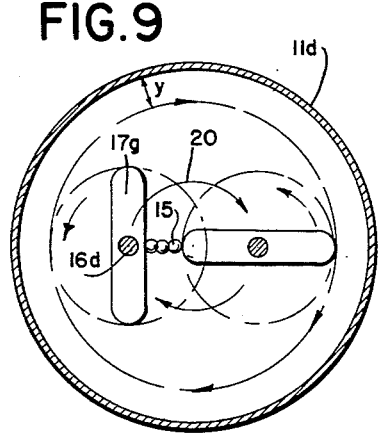
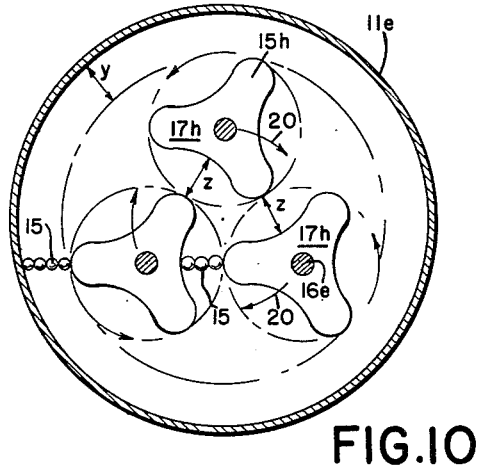
FIG. 10
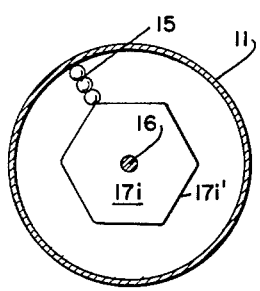
FIG. 11

United States Patent Office 3,199,792
Patented Aug. 10, 1965

3,199,792
COMMINUTING AND DISPERSING PROCESS
AND APPARATUS
Robert W. Norris, Jr., 1710 Front St. NE., Salem, Oreg.
Filed July 20, 1962, Ser. No. 211,341
11 Claims. (Cl. 241—30)

This invention relates to a novel method for finely comminuting solids and for dispersing of finely divided material and to an apparatus for accomplishing this result. More particularly, this invention relates to a method and apparatus for the comminution of solids by means of the novel coaction between loose attritive elements, the walls of a container or housing containing the elements and an impeller member positioned within the container or the like without undesirable contamination of the ground material.

Various type of attritor mills are known in the art for the comminution of solid materials—i.e., to reduce the particle size of the material. One type of an attritor mill is the simple ball mill comprising a cylindrical or spherical chamber which contains a number of balls of a hard material. The chamber is mounted on a trunnion and is adapted to be rotated by means of a power source. The material to be ground is charged through an opening into the chamber, the opening is closed, and the chamber is rotated on its axis until the material has been reduced to a powder. This type of mill relies on the crushing action of forces of impact produced by the balls bouncing against the particles of material in a random fashion to achieve comminution of the material.

Another type of attritor mill comprises a stationary upright cylindrical chamber containing attritive elements, such as steel balls. An agitating device, such as a vertical shaft containing horizontal arms, is disposed within the chamber and is adapted to be rotated on its vertical axis by means of a suitable power source. The material to be comminuted is charged into the chamber, the vertical shaft is rotated at a high speed and the vertical arms collide with the attritive elements thereby imparting an intermittent motion to the elements. Thus, when an arm of the vertical shaft collides with an attritive element, the element is dislodged from its position and a high amount of kinetic energy is thereby imparted to the element. The element, in turn, may collide with another element, thereby dislodging the other element from its position and imparting to it a portion of the kinetic energy of the first element. Comminution of the material results from the irregular impacts of the attritive elements against one another.

Both of the aforedescribed attritor mills have found wide use but have been found subject to several disadvantages in certain arts. The rotating cylinder or sphere type mill requires considerably more power to operate than does a mill in which the container is stationary. Moreover, in this type of mill, the mass of attritive elements and the material which is to be comminuted have a high inertia. Because of this high inertia and because of the centrifugal force exerted on the mass by the rotation of the mill, there is a tendency for the mass to remain stationary on the side of the chamber. This tendency of the mass to remain at rest is overcome when it is raised to a height by the rotation of the chamber at which graviatational pull overcomes the stationary inertia and the centrifugal force of the mass. The highest layer or layers of attritive elements then roll or cascade to the bottom, but the great mass of attritive elements are relatively stable, with little interaction between individual elements.

The stationary attritor mill with an internal agitating member overcomes some of the disadvantages of the rotating mill. However, in this type of mill there are invariably localized "dead" spots or "floating" areas in which the attritive elements are either not moving at all or in which they are moving very slowly. These areas are particularly likely to occur in the proximity of the vertical shaft betwen pairs of horizontal arms in which one arm is located above the other on the vertical shaft. Little or no attritive action takes place in these "dead" spots or "floating" areas and unground material tends to collect in these areas and eventually forms a cohesive mass. The mill must then be shut down and each and every element and part thereof thoroughly cleaned. Another disadvantage of this type of mill is that the arms or other surfaces which extend from the rotary shaft wear away or are eroded due to the frequent impacts with the attritive elements. This causes undesirable contamination and discoloration of the material which is being comminuted. Also, this type of mill tends to cause vortexing of the uncomminuted material because of the high speed at which it is necessary to rotate the vertical shaft in order to obtain the desired movement of the attritive elements. By "vortexing" is meant the tendency of the material to be comminuted to be forced away from the center of the chamber due to centrifugal force. A whirlpool effect is thereby created. In a continuous process, wherein the material to be comminuted is fed in at the bottom and drawn off at the top of the mill, vortexing results in some of the material reaching the top of the mill before it has been comminuted.

The foregoing disadvantages are overcome by this invention which has for its principal object the provision of a constant impact mill that will uniformly crush, grind and/or disperse solids, semi-solids or a suspension of solids in liquids without undesirable contamination of the material which is being comminuted. It is a further object of this invention to provide such a constant impact mill which will prevent the occurrence of "dead" spots within the chamber. It is still another object of this invention to provide a novel method for uniformly grinding and crushing a material without undesirable contamination of the material. It is still another object of this invention to provide a method and apparatus for comminuting solid material in which there is no vortexing of the material. Another object of this invention is to provide an attritor mill comprising an attritive zone defined by a chamber or the wall of a container, a plurality of attritive elements disposed in the zone and an impeller which, upon rotation, causes the attritive elements throughout the entire zone to move relatively to one another with a rolling force to keep all attritive elements in constant motion with respect to other attritive elements, the sides of the container and the impeller.

Briefly, the objects of this invention are attained by providing a novel constant impact mill comprising a substantially vertical chamber which is at least partially filled with a plurality of attritive elements. The chamber is bounded from top to bottom by a laterally curved surface. Disposed within the chamber is at least one vertical member which is rotatable on a vertical axis within the chamber. The distance between the vertical member—i.e., the leading and trailing edges of the member—and the interior surfaces of the chamber at any given time is at least three times the diametric measurement of the largest of the attritive elements. The distance between the edge of the vertical member and the curved surface which comprises the side walls of the chamber at any given instant is relatively constant throughout the vertical length of the vertical member. The size of the individual attritive elements is not particularly critical and may be varied depending upon the size of the material to be comminuted. Generally, the attritive elements will vary in their largest diametric measurement between 1 mm. and 200 mm. when the mill is to be used for comminuting. However, when the mill is to be used for dispersing finely divided material, sand may be employed as the attritive material.

The comminuting and/or dispersing chamber which houses the attritive elements has vertical or substantially vertical side walls—i.e., walls which are either perpendicular or which taper slightly—and which curve laterally. It is preferred that the comminuting chamber have either a circular or a lobate transverse cross-sectional configuration. If lobate, it is preferred to have two or more symmetrical lobes joined adjacent a central axis to provide a cross-sectional shape composed of two or more symmetrical lobes. The chamber may be bounded on its top and bottom ends by a curved or a flat surface. When the apparatus is to be used in a continuous operation—i.e., when the material to be comminuted is continuously fed into one end and the comminuted material is continuously removed from the other end during the operation—the height of the chamber should be greater than the diameter of the chamber. However, when the apparatus is to be used in a batch operation, the height of the chamber may be either greater than or less than the diameter of the chamber. The chamber may be constructed out of materials which are normally used in comminuting mills such as steel, iron or other metals, stone, porcelain, ceramics, etc.

The attritive elements may be made out of any suitable material such as metal, porcelain, plastic, siliceous material, etc. Preferably, the material from which they are made is harder on either the Mohr scale or of greater Brinell hardness than the material which is to be comminuted in order to reduce wearing away of the elements. The attritive elements are preferably spherical balls although they may also be ellipsoids, cones, tores, etc. and mixture thereof. Cylinders may also be used in admixture with elements having shapes as previously mentioned so long as the proportion of cylinders in the mixture is not so large that they will tend to stack up between the edge of the vertical member and the wall of the chamber. The attritive elements contained in the chamber may be of varying sizes and shapes although it is preferred that there not be more than a 200% variation between the diametric measurements of the largest and smallest of the attritive elements. To achieve the maximum comminuting action, the attritive elements should nearly fill the chamber since comminution of the material will only occur in that portion of the chamber occupied by the attritive elements. As previously mentioned, when the mill is used to comminute, the largest diametric measurement of the attritive elements will be between 1 mm. and 200 mm. and the ideal size is determined by the size of the mill, the material to be ground, and the desired fineness of the final material. If the mill is to be used solely to disperse, sand may be used as the attritive material.

The vertical member (or members) is positioned within the chamber so that the clearance or distance between the edge of the member and the chamber wall, when the member is at its closest point to the wall of the chamber, is at least three times the diametric measurement of the largest of the attritive elements. This clearance is necessary in order to keep the attritive elements from "jamming-up" between the vertical member and the chamber. Moreover, for most efficient operation, this distance is preferably not more than fifteen times the diametric measurement of the largest attritive element, except for high-speed rotation with small attritive elements, i.e., smaller than 5 mm. in diameter. It is preferred that this clearance between the edge of the vertical member at its closest point to the chamber wall and the wall of the chamber be from about 4 to 8 times the diametric measurement of the largest attritive elements at low speed and when the elements are larger than 10 mm. The same clearance should also be allowed between the lowermost edge portions of the vertical member and the bottom of the chamber. Moreover, if the chamber is substantially filled with attritive elements, the same clearances should be allowed between the uppermost edge portions of the vertical member and the top of the chamber. Furthermore, if the chamber contains more than one vertical member, the same clearances should be allowed between each of the members at their closest approach to one another; and, as well, between the vertical edges of each member and the wall of the chamber, and between the lowermost and uppermost edge portions of each member and the top and bottom walls of the chamber.

The cross-sectional configuration of the vertical member may vary greatly, e.g., it may be circular, elliptical, oval, lobate, triangular, square or polygonal, etc. The cross-sectional configuration of the vertical member must be such that it will create a continuous flow of all of the attritive elements radially inwardly and outwardly with reference to the walls of the chamber. Thus, if the vertical member has a circular cross section, this effect may be provided by mounting the vertical member on an eccentric axis of rotation with respect to the central axis of the surrounding wall of the chamber. Alternatively, a vertical member having a circular cross section may rotate upon its concentric axis providing there is provided a planetary movement of the member within the chamber. By "planetary movement" is meant that the vertical member revolves or moves in a curved path about the center of the chamber while at the same time rotating on its own axis. Obviously, to achieve a planetary movement, the axis of the vertical member may not be the center of the chamber. If the cross-sectional shape of the vertical member is other than circular, such as elliptical or lobate, the desired action may be achieved by having either a concentric or eccentric axis of rotation. When only one vertical member is to be used in the chamber, it is preferred that the chamber be cylindrical and that the axis of rotation be at or near the center of the chamber.

When two or more vertical members are used in the apparatus, the chamber in which they are to be placed may have a lobate cross-sectional configuration. Each vertical member is then positioned for rotation within one lobe so that there is provided a partially surrounding compartment in which it rotates. Thus, if the chamber has two lobes, two vertical members are used; if the chamber has three lobes, three vertical members are used; etc. Alternatively, two or more vertical members may be employed in a cylindrical chamber. In that case, it is preferred that the system of vertical members be revolved in a planetary movement.

It is preferred that the cross-sectional configuration of the vertical member be relatively constant throughout its length and that the distance between a selected point on the faces or edges of the vertical member and the wall of the chamber at any given instant during the rotation of the member be relatively constant throughout the length of the member. By "relatively constant" is meant that there are no substantial variations in the cross-sectional configuration of the vertical member or in the distance between the vertical member and the wall of the chamber at any given instant during the rotation of the member throughout its length such as there are on a vertical shaft having a plurality of horizontal arms. It is possible, in an apparatus having only one axis of rotation for the vertical member, to use two or more vertical members, each having different cross-sectional configurations, superimposed one above another on the same axis of rotation within the chamber in stacked relation. However, it is preferred that one vertical member having the same cross-sectional configuration throughout the height of the chamber be mounted on the vertical axis.

The vertical member may have a slight twist from top to bottom—not to exceed one convolution throughout its height. Since this configuration has the effect of promoting upward flow of the attritive elements during operation of the apparatus, it should only be used in a batch operation. In a continuous operation, it is desired to have all of the attritive elements remain in the same horizontally and radially extending plane.

The vertical members may be made of a metal, such as iron, steel, hard plastic, porcelain, glass, etc. They may be hollow or solid.

Although it is preferred that both the chamber and the rotatable member be vertical, either or both may be inclined slightly toward the horizontal during the operation of the apparatus. Thus, the rotatable member may be inclined slightly within the chamber while maintaining the chamber vertical; or the chamber may be inclined slightly while keeping the rotatable member vertical; or both the chamber and the rotatable member may be inclined slightly. The vertical member is mounted on a suitable means for effecting rotation of the member such as a vertical shaft. The shaft upon which the vertical member rotates may be connected to a power source by means of gears or it may be chain- or belt-driven. It is preferred that a clutch attachment or a variable speed drive be interposed between the power source and the vertical member to allow the vertical member to be rotated slowly at first and the speed to be gradually increased.

The speed at which the vertical member is rotated may vary greatly and will be dependent upon a number of factors such as the size of the chamber, the diameter of the vertical member, the length of the vertical member, the diameter of the attritive elements, the viscosity characteristics of the suspension of the material being comminuted or dispersed, and the type of operation, i.e., batch or continuous. A convenient means for defining the speed of rotation of the vertical member is by reference to the peripheral speed at the tip of the vertical member, i.e., the point on the periphery of the vertical member which is farthest from the axis of rotation. This speed may be calculated by multiplying the r.p.m. by the circumference (in feet) of the circle circumscribed by the rotation of the vertical member and is expressed in feet per minute. The peripheral speed under operating conditions may vary generally from about 40 to 600 feet per minute and is preferably about 100 feet per minute, but in large measure is dependent on the size of attritive elements. The smaller the size, the faster may be the rotation. For example, when sand is used as the attritive elements, the speed of rotation may be as high as 2000 or more feet per minute.

The apparatus of this invention may be used to finely comminute solids, semi-solids or suspensions of solids in liquids, or to aid in chemical reactions. Examples of materials which may be comminuted or dispersed are calcium carbonate, silica, gypsum, iron ores, agglomerates of titanium dioxide, raw earth materials, talc, dyes, or pigments. For example, calcium carbonate having an average particle size of about 125 microns in diameter may be uniformly reduced to an average particle size of one micron in diameter.

The apparatus may be used to comminute or disperse material in either a batch or a continuous operation. In a batch operation, the material to be comminuted is charged into the chamber as a batch and the vertical member is rotated until the material is reduced to the desired particle size. In a continuous operation, the material to be comminuted is continuously fed into one end of the chamber, preferably as a slurry for ease of handling, while the vertical member is being rotated and the comminuted material is continuously drawn off at the opposite end of the chamber. In the preferred operation of this method and apparatus, material to be comminuted is fed in at the bottom of the chamber at a rate sufficient to allow the material to be completely comminuted at the moment it reaches the top of the chamber. The comminuted material is then drawn off from the top of the chamber.

The speed at which the vertical member is rotated must be adjusted to accommodate the particular type of material which is to be comminuted. For a highly viscous dispersion of solids in a liquid, the vertical member should be rotated at a reduced speed whereas for a highly fluid dispersion, the vertical member may be rotated at a higher speed.

The method or mechanism by which the comminuting or dispersing action is accomplished within this apparatus may best be explained by reference to the vertical zone through which the vertical member moves. The material to be comminuted or dispersed is introduced into the zone which contains a plurality of attritive elements. The rotation of the vertical member on its axis (as well as its movement about another axis within the chamber if involved in planetary movement) creates a continuous flow of all of the attritive elements radially inwardly and outwardly with reference to the peripheral boundary of the zone. Thus, the attritive elements and material to be comminuted or dispersed in the path of the vertical member are displaced and moved from a point nearer the axis of rotation toward the peripheral boundary of the zone and back again toward the axis of rotation of the vertical member in a continuous manner. This may be termed a pumping action and causes each of the attritive elements to rotate about its own axis as well. Thus, there is a continuous rolling and shearing action between adjacent attritive elements in the same horizontal plane and between adjacent attritive elements in different horizontal planes. An attritive element at the edge of the vertical member farthest from the axis of rotation is moved faster than an attritive element nearer to the peripheral wall of the zone or one nearer to the axis of rotation of the vertical member. This results in the attritive elements in one plane having different relative speeds both with respect to movement about their own axes and with respect to their movement relative to the peripheral boundary of the zone. The greater the difference in relative speed, the more effective will be the comminuting capacity of the apparatus.

By this novel coaction of all of the elements of the apparatus, dead spaces (in which there is no movement of the attritive elements) and floating action (in which the elements do not move with respect to one another) are completely avoided. This coaction provides a crushing, squeezing and shearing action on the material to be comminuted between individual adjacent attritive elements, between the attritive elements and the vertical member and between the attritive elements and the walls of the chamber which results in a much more effective comminution of solid material than it has heretofore been possible to accomplish. When the mill is to be used to disperse finely comminuted material such as a pigment in a paint vehicle and sand is used as the attritive material, this same novel coaction provides a quicker and more complete dispersion than it has heretofore been possible to attain. Since the vertical member in the apparatus of this invention is rotated at much lower peripheral speeds or r.p.m. than previously known attritor mills, vortexing of unground material is avoided. Moreover, because of these lower speeds, much less power is required to operate the mill and the entire apparatus has a longer operational existence. Because of the relative mass size of the impeller, it can be made or covered with highly abrasive resistant materials.

This invention will be more particularly described with reference to the accompanying drawings wherein:

FIGURES 3 to 11 are top plan views, partly in cross section of various modifications constituting alternative embodiments of this invention.

The drawings are more fully explained hereinafter with particular reference to the various numerical designations, each individual numeral having the same significance in the different figures.

Figure 1:
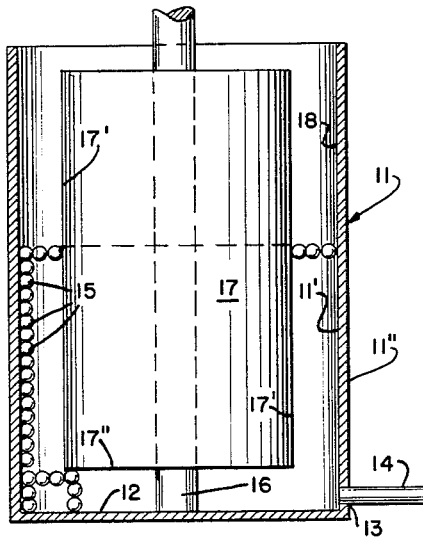
FIGURE 1 is a front elevational view, partly in cross section, or an apparatus constructed according to the invention.
Figure 2:
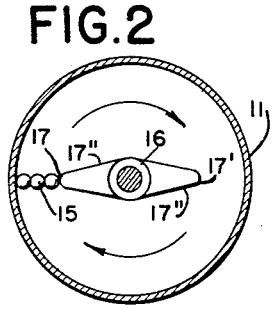
FIGURE 2 is a transverse partial cross-sectional view of the apparatus shown in FIGURE 1.

Referring to the drawings in detail, FIGURES 1 and 2 show a comminuting apparatus constructed according to this invention which comprises a substantially vertically disposed stationary chamber or container 11, which defines a comminuting zone. The chamber 11 is preferably cylindrical and thus has a vertically extending laterally curved side wall which is, in horizontal cross section, of circular shape. The chamber 11 has a bottom wall 12. An inlet opening 13 for receiving a conduit 14 is provided near the bottom of the chamber 11. The chamber 11 may be open at the uppermost end thereof as shown in FIGURE 1, but it may, if desired, be covered with a top wall, not shown. The chamber 11 may be formed from metals, synthetic resinous materials or ceramic compositions.

The chamber 11 is at least partially filled with a pluraltiy of attritive elements 15 which are depicted in FIGURE 1 as being spherical in shape. As described above, the attritive elements 15 may be of solid configurations other than spherical. These elements may be formed of metal, synthetic resins or ceramic materials, but must have a hardness greater than that of the solid to be comminuted. The size of the attritive elemnts 15 is not critical and may be varied, depending upon the average particle size of the material to be subdivided. For greatest efficiency in carrying out this invention, it is preferred to employ attritive elements, the largest diameter of which is two inches or less, but for rough crushing of materials such as ore, or to aid in dissolving resins, they may be larger, the size of the mill being the limiting factor.

The chamber 11 is provided with a vertically disposed journalled shaft 16 which is driven by any suitable source of power and power transmitting means which are not shown in FIGURE 1 since they are wholly conventional. The shaft 16 has mounted thereon for rotation about the vertical axis of rotation thereof, a vertically disposed vane member 17 which extends laterally outwardly from the shaft 16. The vane member 17 extends into the mass of attritive elements to a point close to but spaced from the bottom wall 12 of the chamber 11. The vane member 17, as shown in FIGURE 1, has vertical side edges 17'—17' which are adjacent but spaced from the side wall of the chamber 11. The spacing between the vertical edges 17'—17' and the wall of the chamber or container 11 and between the lowermost end edges 17''—17'' of the vane member 17 and the bottom wall 12 of the container 11 are clearances which must be of at least three times the diameter of the largest attritive element 15.

The vane member 17, like the container 11 and the attritive elements 15, may be formed of any one of numerous materials; such as, for example, metals, synthetic resinous materials and ceramic substances. The member 17 may be constructed as a solid member or it may be a hollow shell member. It is, however, rigidly attached to the shaft 16 and rotates with the latter when it is driven by the power source and power transmitting means mentioned. The form of vane member 17 shown in the embodiment of this invention depicted in FIGURES 1 and 2, consists of a body with faces 17'' which slope from the center of the vane member to the edge and which terminate in the vertical side edges 17'—17'. Thus, the vane member 17 is thickest adjacent to the shaft 16 and tapers toward the side edges 17'—17'.

In operating the apparatus depicted in FIGURE 1, material to be comminuted is fed into the chamber 11 through the opening 12 by means of conduit 14. The vane member 17 is rotated so that the side edge 17' travels at a speed of from about 40 to 300 feet per minute. The rotation of the vane member 17 produces a unique reaction in the attritive elements 15 into which the member 17 extends and the latter, while rotating, functions as an impeller for the attritive elements 15 and the material in the chamber 11 to be subdivided. The attritive elements 15 and material to be comminuted in the path of the face 17'' of the vertical member 17 are displaced and moved from a point nearer the shaft 16 toward the side wall 18 of the chamber 11. This results in a continuous flow of all of the attritive elements 15 and material to be comminuted radially inwardly and outwardly in the same vertical plane relative to the side wall 18 of the chamber 11 as well as a continuous rotation of each attritive element 15 about its own axis. The material to be comminuted is thereby crushed, squeezed and sheared between the individual attritive elements 15, between the attritive elements 15 and the vane member 17 and between the attritive elements 15 and the wall 18 of the chamber 11.

FIGURES 3 to 10 illustrate alternative configurations of the vertical member and/or chamber.

Figure 3:
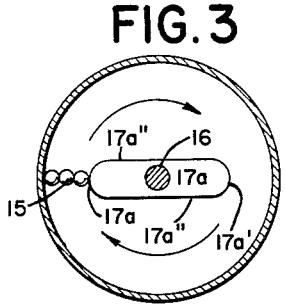

In FIGURE 3, the vane member 17a is mounted for rotation on the shaft 16 within a cylindrical chamber 11. The vane member 17a consists of a thin flat body having parallel faces 17a''—17a'' which terminate in the vertical sides edges 17a'—17a'. The distance between the vertical side edges and the side of the container 11 is three times the diameter of the attritive elements 13.

Figure 4:
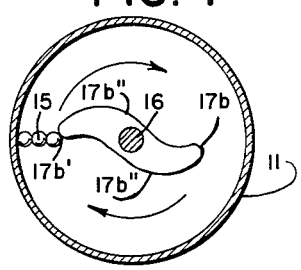

The apparatus depicted in FIGURE 4 is similar to that shown in FIGURE 3 except that the vane member 17b has curvilinear faces 17b''—17b'' which terminate in the vertical side edges 17b'—17b'.

Figure 5:
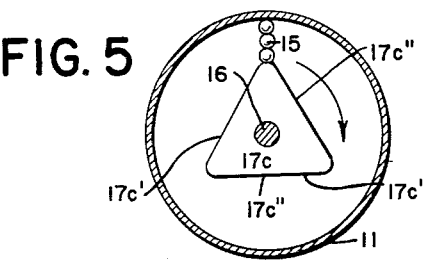

The apparatus shown in FIGURE 5 is similar to that depicted in FIGURES 3 and 4 except that the vertical member 17c has the cross-sectional configuration of a triangle. The side faces 17c''—17c'' terminate in the vertical side edges 17c'—17c'.

Figure 6:
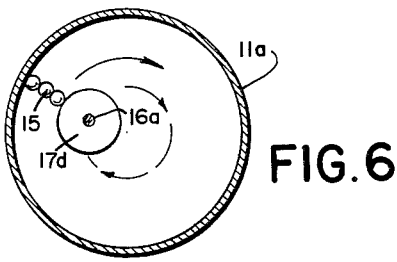
Figure 12:
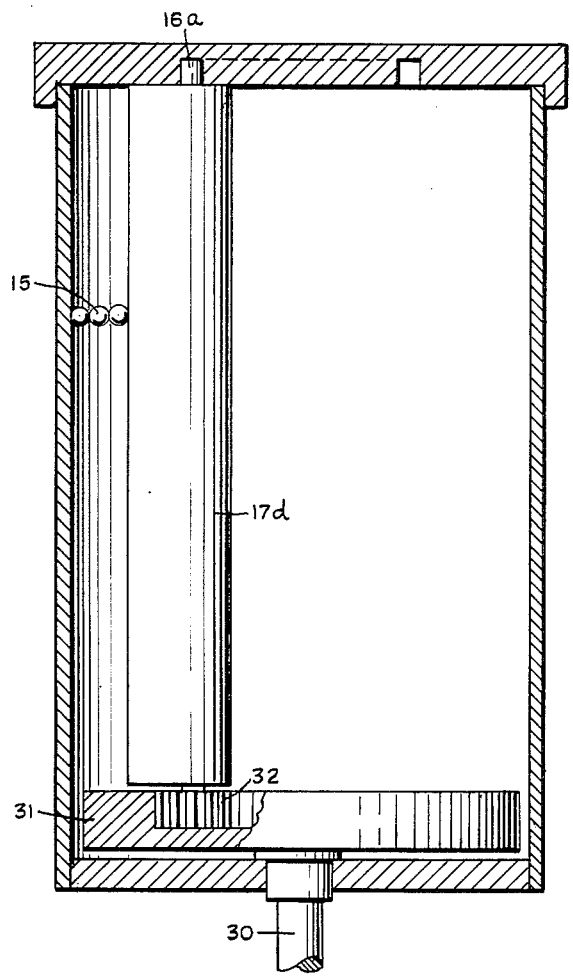
FIGURE 12 is a front elevational view, partly in cross section, of an apparatus embodying a means for planetary movement.

In FIGURE 6, the vane member 17d has a cylindrical cross section and rotates about shaft 16a which is located at the center of the vane member. The shaft 16a and the vane member 17d are mounted on a rotating platform (not shown) so that both the vane member 17d and the shaft 16a revolve in a planetary movement in a circular path, as indicated by the arrows, about the chamber 11a. The vane member may be driven by any well known planetary gearing movement; for example, those of the types shown in United States Patent 1,463,736 which issued on July 31, 1923 to Paul S. Ward, and United States Patent 1,428,704 which issued on Sept. 12, 1922 to Gunther H. Petri.

FIGURE 7 shows a chamber 11b having three lobes 19 on the cross section. A vane member 17e rotates upon an eccentrically located shaft 16b within each of the lobes 19. Thus, each of the rotating members 17e is provided with a partially surrounding compartment in which it rotates. The vertical members 17e rotate in the paths indicated by the arrows in FIGURE 7. The distance between the vertical members 17e at their point of closest approach to one another and the distance y between the wall of the lobe 19 and the path of the member 17e are at least 3 times the diametric measurement of the largest attritive element 15 contained in the apparatus.

FIGURE 8 shows a chamber 11c having two lobes 19a. A vane member 17f rotates upon a centric shaft 16c within each of the lobes 19a. The vertical members 17f have the cross-sectional configurations of a triangle having concave sides. The side faces 17f''—17f'' curve inwardly toward the shaft 16c and terminate in the vertical sides edges 17f'—17f'. The distance between the vertical side edges 17f'—17f' of each vane member 17f at their point of closest approach to one another and the distance between the side edges 17f'—17f' and the wall of the lobe 19a is at least 3 times the diameter of the largest attritive element 15.

FIGURE 9 illustrates a comminuting apparatus in which two vane members 17g are situated in a cylinder 11d having a circular cross section. The vane members 17g are of the same shape as the vane member 17a previously described in FIGURE 3. Each vane member 17g revolves about a shaft 16d which is located at the center of the vane 17g. The shafts 16d move in a circular path about the chamber 11d in the path indicated by the arrows 20 thus moving the vane members 17g in a circular orbit about the chamber 11d.

In FIGURE 10, there are three vertical members 17h situated in the chamber 11e each of which rotates upon a centric shaft 16e. The shafts 16e move in an orbit about the center of the chamber 11e in the path indicated by the arrows 20, thereby imparting a planetary movement to the vane members 17h. The distances y between the wall of the cylinder and the paths of the vertical members and the distances z between the individual vertical members at any time must be at least 3 times the diametric measurement of the largest attritive elements 15 contained in the apparatus.

In FIGURES 8, 9 and 10, the vertical members in each apparatus must be rotated at exactly the same speed so that they will stay in phase. Otherwise, the minimum clearances between the members will not be maintained.

In FIGURE 11, the vane member 17i is mounted for rotation on the shaft 16 within a cylindrical chamber 11. The vane member 17i consists of a vertical member having a hexagonal cross section and six vertical side faces 17i'. It has been found that when the vane member 17i is rotated at high speeds, a vibratory motion of the attritive elements 15 is created.

The apparatus of this invention may be used to advantage to disperse a finely divided solid in a liquid such as a pigment in a paint vehicle as well as to comminute solid material.

The following examples illustrate the best modes contemplated for carrying out the process of this invention.

Example 1

The apparatus used in this example comprised a cylindrical chamber as shown in FIG. 1, 13 inches high and 11½ inches in diameter. The chamber was made of porcelain. A vertical vane or impeller member made of the same material as the chamber having a cross-sectional configuration as shown in FIGURE 5 throughout its length and having a vertical height of 8 inches was mounted on a rotatable shaft in the center of the chamber. The distance between the outermost edge of this member and the inside wall of the chamber was 1¾ inches and the distance between the bottom end of the member and the bottom of the chamber was 1¾ inches. The cylinder was then filled to within 3 inches of the top with porcelain balls of varying diameters. The largest balls had diameters of ½ inch and the smallest balls had diameters of ¼ inch.

An aqueous slurry of $CaCO_3$ having a particle size of up to about 60 microns was prepared. The slurry had a viscosity of about 2000 centipoises (Brookfield No. 3, 30 r.p.m.). The shaft of the vertical member was driven by means of a variable speed drill press at 100 r.p.m. (which corresponds to the outermost tip of the side edge of the vertical member moving at a rate of 210 feet per minute) and the mill was operated by batch technique. In four hours the largest particle size remaining was less than one micron. The particle size of the comminuted $CaCO_3$ was very uniform indicating that there were no dead spots or floating areas within the apparatus. Moreover, no undesirable contamination was found in the comminuted material.

Example 2

The apparatus used in this example comprised a substantially cylindrical chamber which was a tapered five-quart polyethylene plastic bucket, 8 inches in diameter at the top tapering to 6¾ inches in diameter at the bottom. A vertical vane or impeller made of maple wood having a cross-sectional configuration as shown in FIGURE 2 throughout its length, and being 4 inches in diameter at its outside tip was mounted in the chamber on a shaft turned by a variable speed drill press. The minimum distance between the outermost edge of the rotating member and the inside wall of the chamber was 1⅜ inches and the distance between the bottom end of the rotating member and the bottom of the chamber was 1¾ inches. The chamber was filled to within 2 inches of the top with a mixture of porcelain balls of varying diameter. The largest balls had a diameter of ½ inch and the smallest balls had a diameter of ⅜ inch.

A premix of pegments consisting of 1500 parts of ground limestone; 750 parts of long oil alkyd resin (60% solution) and 250 parts of mineral spirits and having an average particle size of about 40 microns but with some particles of as large as 90 microns, was prepared at a viscosity of about 90 Krebs units. The premix showed a zero fineness on the Hegemen Fineness Gauge due to pigment agglomeration. The impeller was driven at about 330 r.p.m. (which corresponds to the outermost tip of the impeller moving at a peripheral speed of 345 feet per minute). At the end of 6 hours the dispersion showed a fineness of 5+ on the Hegemen Fineness Gauge, which represents all particles dispersed and comminuted to a fineness of less than 30 imcrons.

Example 3

The process of Example 2 was repeated except that the impeller used had a cross-sectional configuration as shown in FIGURE 11 and had a diameter of 4 inches. The impeller was rotated at a speed of 330 r.p.m. (which corresponds to a peripheral speed of 345 feet per minute). At the end of 5 hours, the comminuted materials showed a fineness of 5+ Hegemen or less than 30 microns.

Example 4

This example illustrates the dispersion of agglomerated fine pigments using sand as attritive elements. The apparatus used comprised a substantially cylindrical chamber as described in Example 2. A vertical impeller made of maple wood having a cross-sectional configuration as shown in FIG. 5 throughout its length, and being 4 inches in diameter at its outside tip was mounted in the chamber on a shaft turned by a variable speed drill press. The minimum distance between the outermost edge of the rotating member and the inside wall of the chamber was 1⅜ inches and the distance between the bottom end of the rotating member and the bottom of the chamber was ½ inch. The chamber was filled to within 3 inches of the top with 20–30 Ottawa sand, A.S.T.M. C–190.

A premix of pigments consisting of 200 parts of phthalocyanine blue; 300 parts of rutile titanium dioxide; 750 parts of long oil alkyd (60% solids); 25 parts of 24% lead drier and 250 parts of mineral spirits, and having an average particle size of about .4 micron but with some agglomerates of as large as 100 microns, was prepared at a viscosity of about 90 Krebs units. The premix showed a zero fineness on the Hegemen Fineness Gauge due to pigment agglomeration. The impeller was driven at about 1000 r.p.m. (which corresponds to the outermost tip of the impeller moving at a peripheral speed of 1045 feet per minute). At the end of 2 hours the dispersion showed a fineness of 7+ on the Hegemen Fineness Gauge, which represents all particles dispersed and ground to a fineness of 1–5 microns.

Example 5

This example illustrates the dispersion of agglomerated fine pigments using very small porcelain balls at relatively high speed movement. The apparatus used comprised a substantially cylindrical chamber as described in Example 2. A vertical impeller made of maple wood having a cross-sectional configuration as shown in FIGURE 5 throughout its length, and being 4 inches in diameter at its outside tip was mounted in the chamber on a shaft turned by a variable speed drill press.

The minimum distance between the outermost edge of the rotating member and the inside wall of the chamber was 1⅜ inches and the distance between the bottom end of the rotating member and the bottom of the chamber was 2 inches. The chamber was filled to within 2 inches of the top of the bucket with a mixture of porcelain balls of varying diameter. The largest balls had a diameter of ¼ inch and the smallest balls had a diameter of 3⁄16 inch.

A premix of pigments consisting of 200 parts of phthalocyanine blue; 300 parts of rutile titanium dioxide; 750 parts of long oil alkyd resin; 25 parts of 24% lead drier and 250 parts of mineral spirits, and having an average particle size of about 0.3 micron but with some agglomerates of as large as 100 microns, was prepared at a viscosity of about 90 Krebs units. The premix showed a zero fineness on the Hegemen Fineness Gauge due to pigment agglomeration. The impeller was driven at about 500 r.p.m. (which corresponds to the outermost tip of the impeller moving at a peripheral speed of 522 feet per minute). At the end of 1 hour the dispersion showed a fineness of 7+ on the Hegemen Fineness Gauge, which represents all particles dispersed or ground to a fineness of 1–5 microns.

*Example 6*

This example demonstrates the use of the mill for reducing particle size of coarse materials in a continuous manner. The apparatus used comprised a cylindrical chamber as shown in FIG. 1, 4 feet high and 15 inches in diameter. The chamber was made of concrete lined with ⅛ inch thick cured epoxy resin. A vertical impeller made of Oregon Oak coated with a ⅛ inch thick coating of cured epoxy resin, having a diameter of 8 inches and a cross-sectional configuration as shown in FIGURE 5 throughout its entire length and a vertical height of 3¾ feet, was mounted on a rotatable shaft in the center of the chamber. The distance between the outermost edge of this rotating member and the inside wall of the chamber was 3½ inches and the distance between the bottom end of the rotating member and the bottom of the chamber was 3 inches. The cylinder was filled to within 4 inches of the top with porcelain balls of varying diameter. The largest balls had a diameter of ¾ inch and the smallest had a diameter of ⅜ inch.

A premix of pigments having an average particle size of about 30 microns but with some particles as large as 80 microns, was prepared at a viscosity of 88 Krebs units. The premix showed a fineness of less than one on the Hegemen Gauge due to the large amount of poorly ground pigments. The premix consisted of: 215 pounds dry ground North Carolina micaceous rock; 100 pounds dry ground natural gypsum; 2 pounds lecithin; 70 pounds non-chalking rutile titanium dioxide; 150 pounds long oil alkyd solution 60% solids, 114 pounds mineral spirits. The premix was pumped into the bottom of the mill until it showed at the top of the balls in the mill. The mill was then run at 100 r.p.m. (equivalent to a peripheral speed of 208 feet per minute) for 2 hours at which time the materials in the top of the mill showed a fineness of 5 (corresponding to reduction in size of the large, 80 micron materials, to less than 40 microns). The pump was turned on and adjusted to pump in 4 gallons per hour. The comminuted material was continuously drawn off the top of the cylinder through a screen. The materials continued to show that the largest particles coming from the mill to be under 40 microns; this indicated that there were no areas of non-grinding, or dead spots, and no transfer of the unground feed materials into the finished materials. There was no metal discoloration in the end product.

I claim:

1. An apparatus for finely comminuting solid material and for dispersing agglomerates of finely comminuted material which comprises:

(a) a substantially vertical chamber, said chamber being bounded laterally from top to bottom by a curved surface;

(b) said chamber being at least partially filled with a plurality of attritive elements;

(c) said chamber having disposed therein at least one substantially vertical elongated impeller means for imparting a continuous flow of said attritive elements in an arcuate path and radially inwardly and outwardly with reference to the curved surfaces of said chamber throughout the vertical extent of said impeller means, said impeller means being rotatable about a substantially vertical axis within said chamber, said impeller means having a vertical surface which has portions spaced at different distances from said axis than other portions of said surface, said impeller means having a portion closest to said curved surface of said chamber extending continuously at a substantially constant distance from said curved surface throughout the vertical extent of said impeller means, means for rotating said impeller means about said axis to cause the portions of said impeller surface closest to said curved surface to move in an arcuate path parallel to said curved surface, the minimum distance between said impeller means and said curved surface at any time being at least three times the diametric measurement of the largest of said attritive elements.

2. The apparatus according to claim 1 wherein said impeller means comprises a thin body having substantially flat, vertical surfaces on each side thereof.

3. The apparatus according to claim 1 wherein said chamber is cylindrical.

4. The apparatus according to claim 1 wherein the height of said chamber is greater than the diameter of said chamber.

5. The apparatus according to claim 1 wherein the attritive elements are spherical bodies.

6. The apparatus according to claim 5 wherein there is not more than a 200% variation between the diametric measurements of the largest and smallest of said spherical bodies.

7. An apparatus for finely comminuting solid material which comprises:

(a) a substantially vertical cylindrical chamber;

(b) said chamber being at least partially filled with a plurality of attritive elements;

(c) said chamber having rotatably mounted therein a plurality of vertical elongated members, each of said members having a relatively constant cross sectional configuration throughout its length, each member being rotatable on its own axis and all members being rotatable in a planetary path about the center of said chamber, said members being adapted to create upon rotation a continuous flow of all of said attritive elements radially inwardly and outwardly with reference to the vertical walls of said chamber, the distance between the peripheral edge of each of said members and the interior surface of said chamber and the distance between any part of each of said members at any time being at least three times the diametric measurements of the largest of said attritive elements, said distances changing upon rotation of said members.

8. An apparatus for finely comminuting solid material which comprises:

(a) a vertical chamber having a lobate transverse cross-sectional configuration;

(b) said chamber being at least partially filled with a plurality of attritive elements;

(c) said chamber having disposed therein a number equivalent to the number of lobes on said chamber of substantially vertical elongated impeller means for imparting a continuous flow of said attritive elements in an arcuate path and radially inwardly and outwardly with reference to the lobate surfaces of said chamber throughout the vertical extent of each of said impeller means, each of said impeller means being rotatable about a substantially vertical axis within one of said lobes of said chamber, each of said impeller means having a vertical surface which has portions spaced at different distances from its said axis than other portions of said surface, each of said impeller means having a portion closest to said lobate surface of said chamber extending continuously at a substantially constant distance from said lobate surface throughout the vertical extent of said impeller means, means for rotating each of said impeller means about its said axis to cause the portions of said impeller surface closest to said lobate surface to move in an arcuate path parallel to said lobate surface, the minimum distance between each of said impeller means and said lobate surface at any time being at least three times the diametric measurement of the largest of said attritive elements.

9. An apparatus for dispersing finely comminuted material which comprises:

(a) a substantially vertical chamber, said chamber being bounded from top to bottom by a curved surface;

(b) said chamber being at least partially filled with attritive elements comprising sand;

(c) said chamber having disposed therein at least one substantially vertical elongated impeller means for imparting a continuous flow of said attritive elements in an arcuate path and radially inwardly and outwardly with reference to the curved surfaces of said chamber throughout the vertical extent of said impeller means, said impeller means being rotatable about a substantially vertical axis within said chamber, said impeller means having a vertical surface which has portions spaced at different distances from said axis than other portions of said surface, said impeller means having a portion closest to said curved surface of said chamber extending continuously at a substantially constant distance from said curved surface throughout the vertical extent of said impeller means, means for rotating said impeller means about said axis to cause the portions of said impeller surface closest to said curved surface to move in an arcuate path parallel to said curved surface, the minimum distance between said impeller means and said curved surface at any time being at least three times the diametric measurement of the largest of said attritive elements.

10. An apparatus for finely comminuting solid material and for dispersing agglomerates of finely comminuted material which comprises:

(a) a substantially vertical chamber, said chamber being bounded laterally from top to bottom by a curved surface;

(b) said chamber being at least partially filled with a plurality of attritive elements having a diametric measurement larger than 10 mm.

(c) said chamber having disposed therein at least one substantially vertical elongated impeller means for imparting a continuous flow of said attritive elements in an arcuate path and radially inwardly and outwardly with reference to the curved surfaces of said chamber throughout the vertical extent of said impeller means, said impeller means being rotatable about a substantially vertical axis within said chamber, said impeller means having a vertical surface which has portions spaced at different distances from said axis than other portions of said surface, said impeller means having a portion closest to said curved surface of said chamber extending continuously at a substantially constant distance from said curved surface throughout the vertical extent of said impeller means, means for rotating said impeller means about said axis to cause the portions of said impeller surface closest to said curved surface to move in an arcuate path parallel to said curved surface, the minimum distance between said impeller means and said curved surface at any time being from about four to eight times the diametric measurement of the largest of said attritive elements.

11. A method for uniformly comminuting a solid material and for dispersing agglomerates of finely comminuted material which comprises introducing said material into a substantially vertical elongated zone which is at least partially filled with a plurality of attritive elements, said zone being bounded laterally from top to bottom by a curved surface, rotating at least one substantially vertical elongated impeller means about a substantially vertical axis within said zone, said impeller means having a vertical surface which has portions spaced at different distances from said axis than other portions of said surface, said impeller means having a portion closest to said curved surface of said zone extending continuously at a substantially constant distance from said curved surface throughout the vertical extent of said impeller means, the minimum distance between said impeller means and said curved surface at any time being at least three times the diametric measurement of the largest of said attritive elements, said rotation causing the portions of said impeller surface closest to said curved surface to move in an arcuate path parallel to said curved surface thereby imparting a continuous flow of said attritive elements in an arcuate path and radially inwardly and outwardly with reference to the curved surfaces of said zone throughout the vertical extent of said impeller means.

References Cited by the Examiner
UNITED STATES PATENTS

| | | | |
|---|---|---|---|
| 1,525,790 | 2/25 | Bartley | 241—176 |
| 2,041,287 | 5/36 | Frisch | 241—172 X |
| 2,764,359 | 9/56 | Szegvari | 241—170 X |
| 2,822,987 | 2/58 | Uhle | 241—172 |
| 3,008,657 | 11/61 | Szegvari | 241—170 |
| 3,050,263 | 8/62 | Barkman et al. | 241—172 X |

J. SPENCER OVERHOLSER, *Primary Examiner.*

R. A. O'LEARY, *Examiner.*